United States Patent
Neidrich

(10) Patent No.: US 8,153,353 B2
(45) Date of Patent: Apr. 10, 2012

(54) ULTRA DARK POLYMER

(75) Inventor: Jason Michael Neidrich, Fairview, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 12/575,670

(22) Filed: Oct. 8, 2009

(65) Prior Publication Data
US 2010/0025715 A1    Feb. 4, 2010

Related U.S. Application Data

(62) Division of application No. 11/304,042, filed on Dec. 15, 2005, now Pat. No. 7,601,486.

(51) Int. Cl.
*G03C 1/835* (2006.01)
*H01L 21/02* (2006.01)
*H01L 21/70* (2006.01)
*H01L 21/77* (2006.01)
*G02B 26/00* (2006.01)

(52) U.S. Cl. ........ 430/319; 430/321; 430/950; 430/961; 438/952; 438/964; 438/780; 438/781; 438/763

(58) Field of Classification Search .................. None
See application file for complete search history.

(56) References Cited

U.S. PATENT DOCUMENTS

| | | | |
|---|---|---|---|
| 4,515,828 A | 5/1985 | Economy et al. | |
| 4,716,086 A | 12/1987 | Gillery et al. | |
| 5,500,534 A | 3/1996 | Robinson et al. | |
| 5,706,067 A * | 1/1998 | Colgan et al. | 349/114 |
| 5,754,260 A * | 5/1998 | Ooi et al. | 349/10 |
| 6,214,637 B1 | 4/2001 | Kim et al. | |
| 6,282,010 B1 * | 8/2001 | Sulzbach et al. | 359/249 |
| 6,436,763 B1 | 8/2002 | Huang et al. | |
| 6,537,411 B1 | 3/2003 | Kang et al. | |
| 6,765,724 B1 | 7/2004 | Kramer | |
| 6,879,014 B2 | 4/2005 | Wagner et al. | |
| 7,601,486 B2 | 10/2009 | Neidrich | |
| 2002/0045341 A1 | 4/2002 | McTeer | |
| 2004/0100677 A1 | 5/2004 | Huibers et al. | |
| 2004/0136044 A1 | 7/2004 | Miller et al. | |
| 2005/0008784 A1 | 1/2005 | Martin et al. | |
| 2006/0133764 A1 | 6/2006 | Okubora et al. | |

* cited by examiner

*Primary Examiner* — Sin J. Lee

(74) *Attorney, Agent, or Firm* — Charles A. Brill; Wade J. Brady, III; Frederick J. Telecky, Jr.

(57) ABSTRACT

A method and a material for creating an antireflective coating on an integrated circuit. A preferred embodiment comprises applying a dark polymer material on a reflective surface, curing the dark polymer material, and roughening a top surface of the dark polymer material. The roughening can be achieved by ashing the dark polymer material in an ash chamber. The dark polymer material, preferably a black matrix resin or a polyimide black matrix resin, when ashed in an oxygen rich atmosphere for a short period of time, forms a surface that is capable of absorbing light as well as randomly refracting light it does not absorb. A protective cap layer may be formed on top of the ashed dark polymer material to provide protection for the dark polymer material.

10 Claims, 5 Drawing Sheets

ULTRA DARK POLYMER

This application is a divisional of application Ser. No. 11/304,042, filed Dec. 15, 2005.

TECHNICAL FIELD

The present invention relates generally to a method and material for integrated circuits, and more particularly to a method and a material for creating an antireflective coating on an integrated circuit.

BACKGROUND

Image display systems that employ image projection techniques, such as spatial light modulators (SLMs) using arrays of digital micromirror devices (DMDs), deformable mirrors, liquid crystal on silicon, and so forth, can suffer from a degraded contrast ratio (a ratio of brightest white to darkest black producible) due to reflections of a light used to project the images from parts of the arrays not intended to reflect light. Light can scatter from support structures, apertures, vias, and so forth from the array of light modulators. The scattered light can effectively reduce the darkness of the darkest black, therefore reducing the contrast ratio. For example, in a SLM using DMD technology, light can scatter from electrode structures, micromirror support structures, mirror vias, and so on.

One technique to reduce reflection is to place an antireflective coating on metal structures in the array of light modulators. Since the substrates and underlying structures can be a significant source of unintended reflection, the use of the antireflective coating can significantly improve the contrast ratio. For example, uncoated aluminum can have a reflectivity as high as 92 percent while coated aluminum can have a reflectivity of approximately two to three percent.

A second technique that can be used to reduce unintended reflection is to place a coating, such as an antireflective coating on the substrate of the integrated circuit. The coating can cover the substrate as well as any underlying structure formed in the substrate and help to reduce light reflectivity.

One disadvantage of the prior art is that the application of the antireflective coating on the substrate and the underlying structures as well as the metal structures is that the antireflective coating will have different reflectivity characteristics depending upon a wavelength of the light incident on the antireflective coating. Therefore, it can be difficult to create a single antireflective coating that can perform well with different wavelengths of light. This may lead to the use of an antireflective coating that is a compromise and result in a solution that does not yield optimal performance.

A second disadvantage of the prior art is that since the reflectivity characteristics of the antireflective coating can change depending upon the wavelength of the incident light, it may be possible that the use of the antireflective coating can have an undesired change in the color point of the display system. This can be a result of certain wavelengths of light reflecting in greater proportions than other wavelengths of light.

Yet another disadvantage of the prior art is that the antireflective layer can have an issue with non-uniform thickness. The non-uniform thickness may result in non-uniform antireflective properties.

SUMMARY OF THE INVENTION

These and other problems are generally solved or circumvented, and technical advantages are generally achieved, by preferred embodiments of the present invention which provides a method and a material for an antireflective coating in an integrated circuit.

In accordance with a preferred embodiment of the present invention, an antireflective coating is provided. The antireflective coating includes a dark polymer material overlying a reflective surface. The antireflective properties of the dark polymer material are enhanced by roughening a top surface of the dark polymer material.

In accordance with another preferred embodiment of the present invention, a method for creating an antireflective coating is provided. The method includes applying a dark polymer material on a reflective surface and curing the dark polymer material. The method also includes roughening a top surface of the dark polymer material.

In accordance with another preferred embodiment of the present invention, an integrated circuit is provided. The integrated circuit includes a substrate containing transistors and conductors and an array of light modulators. The integrated circuit also includes an antireflective coating that covers the substrate, the antireflective coating is formed from a dark polymer matrix. The array of light modulators to modulate light based upon image data to display the image data on a display plane.

An advantage of a preferred embodiment of the present invention is that standard, readily available materials and manufacturing processes are used, so implementation of the present invention can be inexpensive and does not require investment in new manufacturing processes or expertise. Therefore, the cost of products with the present invention will not significantly increase.

A further advantage of a preferred embodiment of the present invention is that the reflectivity characteristics of the present invention can be significantly lower than that of previously used techniques. This can yield products with better performance characteristics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an SLM system using digital micromirror devices (DMDs) as light modulators. The invention may also be applied, however, to other SLM systems, such as those using deformable mirror, liquid crystal, or liquid crystal on silicon light modulators. Additionally, the invention may also be applied to other applications where there is a need to reduce unintended reflections. Examples of these applications include light modulators used in non-display applications, including displacement monitors, accelerometers, photolithography, and so forth, as well as micro electrical machine systems (MEMS) devices used, for example, in laser pointers.

Figure 1A:
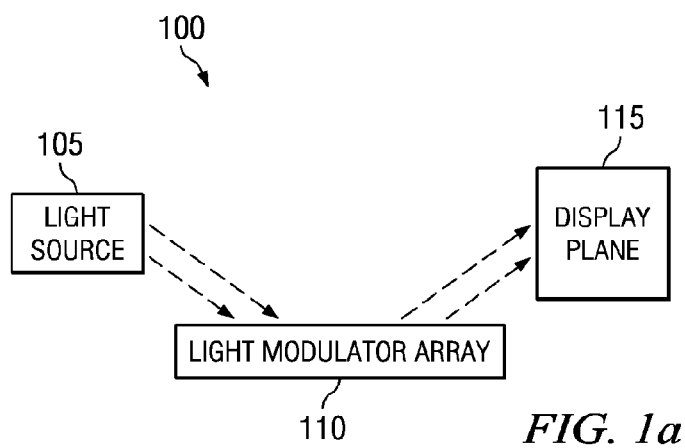
FIGS. 1a and 1b are diagrams of exemplary SLM systems and light modulator arrays.

With reference now to FIG. 1a, there is shown a diagram illustrating an SLM system 100. The SLM system 100 features a light source 105 that provides light to a light modulator array 110. The light modulator array 110 contains a plurality of light modulators (not shown) that manipulate the light to display an image on a display plane 115. The light modulators in the light modulator array 110 can make use of a wide variety of light modulator technologies, such as positional micromirror, deformable mirror, liquid crystal on silicon, and so forth. For discussion purposes, the focus will be placed upon positional micromirrors used in a digital micromirror device (DMD). However, this should not be construed as being limiting on the spirit and scope of the present invention.

Depending upon a positional micromirror's position, light from the light source 105 can either reflect onto the display plane 115 or to some other portion of the SLM system. The light reflecting onto the display plane 115 forms the image being displayed and the light reflecting to another portion of the SLM system is not visible on the display plane 115. Therefore, the state of individual picture elements can be displayed. If a picture element is to be on, then a positional micromirror associated with the picture element will reflect light from the light source 105 onto the display plane 115 and the portion of the display screen will be lit. On the other hand, if the picture element is to be off, then the positional micromirror will reflect light from the light source 105 to a different portion of the SLM system and the portion of the display screen will be dark.

However, light from the light source 105 can reflect from structures on the light modulator array 110 other than the light modulators themselves. This unintended reflection can have a negative effect on the SLM system's contrast ratio, thereby reducing overall image quality. For example, it is possible for light to reflect from apertures, vias, support structures, electrode structures, micromirror supports, and so forth on and in the light modulator array 110.

Figure 1B:
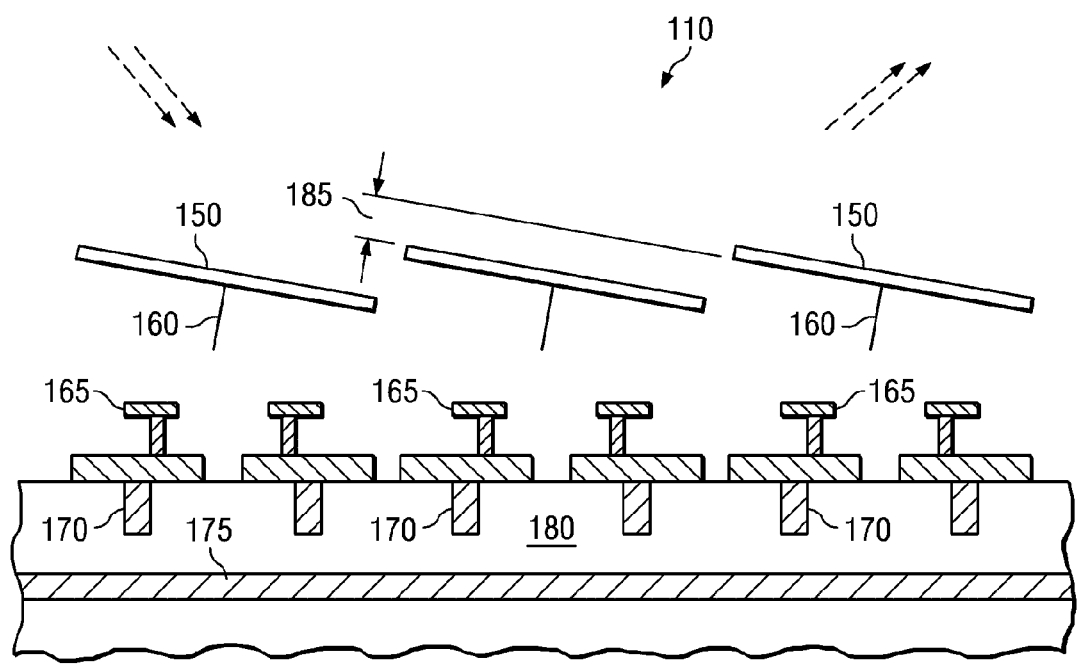

With reference now to FIG. 1b, there is shown a diagram illustrating a detailed view of a portion of the light modulator array 110, wherein positional micromirrors are used as light modulators. The diagram illustrates a portion of the light modulator 110 with three positional micromirrors, such as positional micromirror 150. The diagram also illustrates other structures making up the light modulator array 110, such as a positional micromirror structure 160, electrode structure 165, and so forth. Additionally, there can be structures such as vias 170, metal conductors 175, and so on buried beneath or on a surface of a substrate 180. The metal conductors 175 may be used to route electrical signals in the integrated circuit and some of the metal conductors may be used to connect to the vias 170, while some may not. The diagram shown in FIG. 1b does not intend to limit the metal conductors to not connect to the vias 170. It is possible for light from the light source 105 to travel through gaps, such as gap 185, present between adjacent positional micromirrors and strike these structures (as well as a top surface of the substrate 180) and scatter. The light from the unintended reflections can strike the display plane 115, degrading the contrast ratio of the SLM system.

Figure 2A:
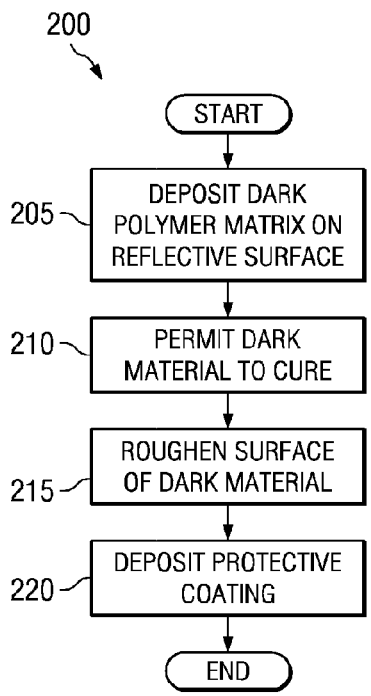
FIGS. 2a and 2b are diagrams of a sequence of events in the formation of an antireflective layer on a reflective surface, according to a preferred embodiment of the present invention.

With reference now to FIG. 2a, there is shown a diagram illustrating a sequence of events 200 in the formation of an antireflective layer on a reflective surface, according to a preferred embodiment of the present invention. The formation of the antireflective layer can begin after the reflective surface to be covered by the antireflective layer has been completed. For example, if the reflective surface is a metallic conductor, the antireflective layer can be formed after the metallic conductor has been created. If the reflective surface is a substrate, then the antireflective layer, can be formed after the formation of substantially all structures, such as transistors, resistors, capacitors, electrodes, passivation layers, and so forth, that are to be beneath the antireflective layer have been formed on the substrate. If additional structures, such as micromirrors for use in a DMD, are to be formed over the antireflective coating, then the structures may require the application of another antireflective coating or an antireflective coating may not be used.

The formation of the antireflective layer can begin with a deposition of a dark polymer matrix on the reflective surface (block 205). Depending upon the nature of the reflective surface, different techniques can be used to deposit the dark polymer matrix. For example, if the reflective surface is a substrate, then it can be possible to use a spin coat technique to deposit the dark polymer matrix over an entire semiconductor wafer. However, if only certain structures on a substrate, for example, metallic conductors, are to be covered by the dark polymer matrix, then potentially, a photoresistive printing technique may be required to deposit the dark polymer matrix. Yet another technique for depositing the dark polymer matrix can be reflow. The use of reflow can allow the dark polymer matrix to create a planar surface (typically more planar than achievable using spin coating) that is more conducive to subsequent fabrication steps. Examples of the dark polymer matrix can be one of a wide variety of directly imageable black matrix resins (such as PSK™ 1000 or PSK™ 2000 from Brewer Science Specialty Materials) or a polyimide black matrix resin (such as DARC® 102, DARC® 300, or DARC® 400 from Brewer Science Specialty Materials). Other directly imageable black matrix resins or a polyimide black matrix resin may also be used. Additionally, other dark thin film solutions or dark spin on glass materials are also usable as the dark polymer matrix. Preferably, the material used as the dark polymer matrix should be as dark as possible to enhance the non-reflective properties.

Once deposited onto the reflective surface, the dark polymer matrix can be allowed to cure (block 210). The curing process may simply involve time or it may involve temperature or both. The curing process will typically involve the elimination (typically through evaporation) of solvents present in the dark polymer matrix to enable the deposition process. Once cured, a wafer containing the reflective surface that has been covered by the dark polymer matrix can undergo a roughening of the surface of the dark polymer matrix (block 215). The roughening of the surface of the dark polymer matrix can help improve the antireflective properties of the antireflective coating by creating irregular markings and formations on the surface of the dark polymer matrix that can help it randomly disperse any light striking its surface as well as increase the light absorptive properties of the dark polymer matrix. A detailed discussion of a preferred embodiment of the roughening process is provided below.

After the roughening processing, the dark polymer matrix can be covered with a protective cap coating (block 220) deposited by sputtering and followed with a process step of oxidizing the protective coating, for example. According to a preferred embodiment of the present invention, the protective cap coating can be formed from aluminum, an alloy of aluminum, tungsten, an alloy of tungsten, copper, an alloy of copper, cobalt, an alloy of cobalt, titanium, an alloy of titanium, and other metals and their alloys as long as the deposition temperature for the metals and their alloys is lower than the curing temperature of the dark matrix polymer. In addition to sputter deposition, electroless plating can also be used to deposit the protective cap coating. For example, electroless plating of copper can be used to form the protective cap coating.

For a protective cap coating of aluminum, the thickness of the protective cap coating should be less than 100 to 150 Angstroms, with approximately 40 Angstroms being preferred. The deposition of the protective cap coating can be achieved in a single step that results in the deposition of the desired thickness of protective cap coating material onto the dark polymer matrix. Alternatively, the protective cap coating can be deposited in a thin layer that can be repeated to provide the desired thickness. The sputter deposition of the protective cap coating can be sufficiently thin so that it does not affect the optical properties of the dark polymer matrix. The protective cap coating can protect the roughened surface of the dark polymer matrix formed in the roughening process from damage from subsequent processing steps. The very thin layer of the protective cap coating does not harm the antireflective properties of the dark polymer matrix. The protective cap coating can be optional since it is possible to continue the processing of the wafer without the protective cap coating. However, the continued processing of the wafer can damage the antireflective layer (the ashed dark polymer matrix) and harm its antireflective properties.

Figure 2B:
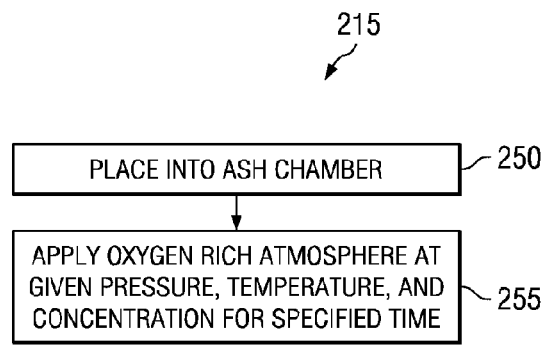

With reference now to FIG. 2b, there is shown a diagram illustrating a detailed view of a roughening of the dark polymer matrix, according to a preferred embodiment of the present invention. The diagram shown in FIG. 2b may be an embodiment of the roughening of the dark polymer matrix, block 215 (FIG. 2a). According to a preferred embodiment of the present invention, an ashing process can be used to roughen the surface of the dark polymer process.

Typically, the ashing process can be used to remove resist from a substrate by exposing the resist to an oxygen-rich atmosphere at a given temperature and pressure for a specified amount of time. The ashing process can begin by placing the wafer into an ash chamber (block 250) and then exposing the wafer to the oxygen rich atmosphere at a given temperature, pressure, and concentration for a period of time (block 255). When the ashing process is applied to the dark polymer matrix, the surface of the dark polymer matrix is etched by the oxygen atoms to reduce the reflectivity of the dark polymer matrix. The ashing process results in an anisotropic etching of the dark polymer matrix that prevents an undercutting of the surface of the dark polymer matrix. If an isotropic etch were used, an undercutting of the surface of the dark polymer matrix may occur, which could reduce the antireflective properties of the antireflective coating.

A typical ashing operation involves the exposing of a wafer containing the dark polymer matrix to an oxygen rich atmosphere with a chamber pressure ranging from 700 to 850 mTorr, an excitation power source with a power rating in the range of 180 to 250 Watts, and an electrode-to-wafer spacing ranging from 0.09 to 1.3 Mils. The atmosphere of the ash chamber can contain both oxygen ($O_2$) at a regulated pressure of approximately 20 standard cubic centimeters per minute (SCCM). The atmosphere of the ash chamber may also contain helium (He) gas at a regulated pressure of approximately 45 SCCM. The wafer being ashed needs to be held in position during the ashing process, either pressure clamping or an electrostatic chuck can be used to hold the wafer in place. If pressure clamping is used, then helium gas can also be used to provide backside pressure to suction the wafer into place against a chuck. The helium should have a flow of approximately 25 SCCM with a pressure of about 6 Torr. An exemplary set of ashing parameters can be as follows: chamber pressure of about 800 mTorr, an excitation power source producing 220 Watts, an electrode-to-wafer spacing of approximately 1.1 Mils, a helium pressure of about 45 SCCM, an oxygen pressure of about 20 SCCM, and a helium clamping pressure of about 6 Torr.

The duration of the ashing process can be an important determinant of the antireflective properties of the antireflective coating. The longer the duration, the larger the marks and formations created on the surface of the dark polymer matrix. However, if the duration is too great, the marks and formations formed on the surface of the dark polymer matrix can actually be cut (etched) away from the surface of the dark polymer matrix, thereby decreasing the antireflective properties of the antireflective coating. If this was to occur, then the ashing process can be extended to recreate the marks and formations that were cut away. A preferred ashing time is less than one minute.

Figure 3A:
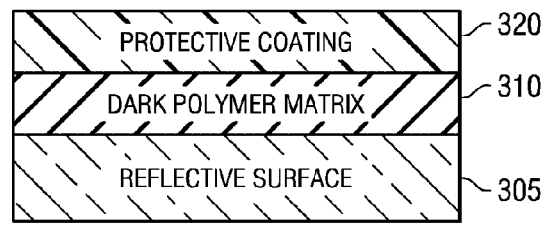
FIGS. 3a through 3f are diagrams of a cross-sectional views of an application of a dark polymer matrix on a reflective surface, a light modulator array with a coating of the dark polymer matrix, active areas of a light modulator coated with the dark polymer matrix, and a top view of an array of light modulators, according to a preferred embodiment of the present invention.

With reference now to FIG. 3a, there is shown a diagram illustrating a cross-sectional view of an application of a dark polymer matrix on a reflective surface to reduce the reflective surface's reflectivity, according to a preferred embodiment of the present invention. The diagram shown in FIG. 3a illustrates a reflective surface 305 and a layer of dark polymer matrix 310. The reflective surface 305 can be a semiconductor substrate, a metallic conductor, a polysilicon surface, and so forth. Alternatively, the reflective surface 305 may be a semiconductor substrate that may contain formed structures, such as transistors, resistors, conductors, electrodes, and so on. The dark polymer matrix 310 can be deposited on the reflective surface 305 by a spin coating process, for example. After the spin coating process, the dark polymer matrix 310 can be allowed to cure and then the reflective surface 305 and the dark polymer matrix 310 can be placed into an ash chamber and subjected to an oxygen rich atmosphere with a given concentration, pressure, and temperature for a given time.

Reflow can be an alternate method for depositing the dark polymer matrix 310 onto the reflective surface 305. The ashing operation can etch a top surface of the dark polymer matrix 310 to enhance the dark polymer matrix's reflectivity characteristics, as described previously. After the ashing of the dark polymer matrix 310, a protective coating 320 (a protective cap coating from block 220 (FIG. 2a)) can be deposited to protect the surface of the dark polymer matrix 310.

Figure 3B:
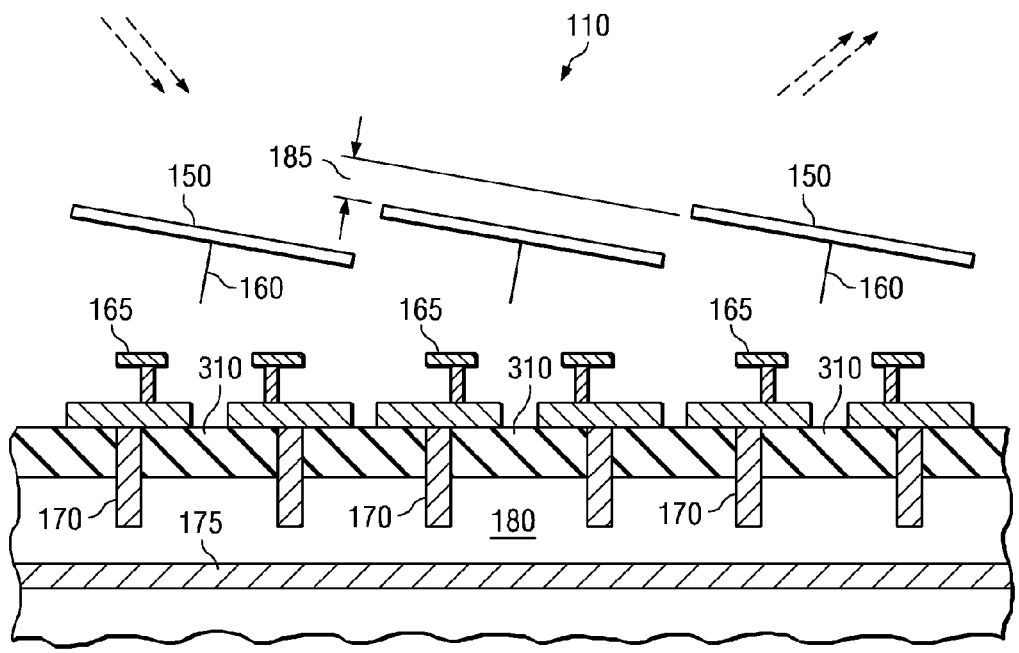

With reference now to FIG. 3b, there is shown a diagram illustrating a detailed view of a portion of a light modulator array 110, wherein the dark polymer matrix 310 is used as an antireflective coating, according to a preferred embodiment of the present invention. The dark polymer matrix 310 is deposited onto the substrate 180, covering the substrate 180 and any structures formed on or below the substrate 180, such as vias 170 and conductors 175. The micromirrors 150 of the light modulator array 110 and electrode structures 165 are formed later during the fabrication process and therefore are above the dark polymer matrix 310. However, it is possible to form an antireflective coating on the micromirrors 150 (also referred to as an active area of the light modulator) to help further reduce light scattering.

Figure 3C:
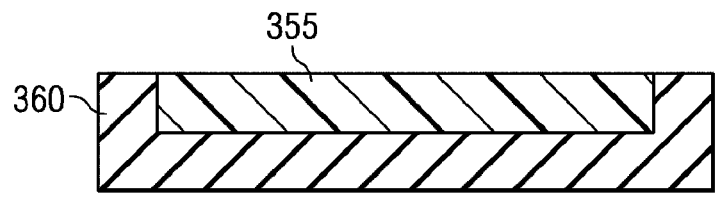
Figure 3D:
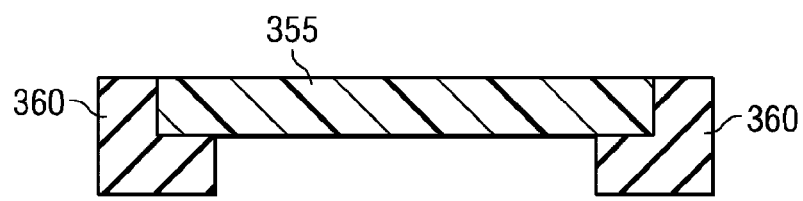
Figure 3E:
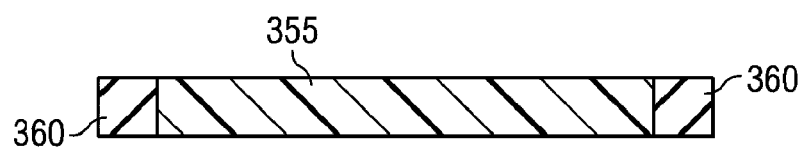

With reference now to FIGS. 3c through 3e, there are shown diagrams illustrating a cross sectional view of an active area of light modulators with antireflective coatings applied to help reduce light scatter, according to a preferred embodiment of the present invention. The diagrams shown in FIGS. 3c through 3e illustrate an active area 355 (a micromirror) of a light modulator that has an antireflective coating applied on portions of the surface that are not used to modulate light to help reduce light scatter. The use of the antireflective layer can also be applied to other types of light modulators to help reduce light scatter. For example, in a liquid crystal display light modulator, the antireflective coating can be applied to a spacing between the individual liquid crystal elements where conductors are run to reduce light scatter. The diagram shown in FIG. 3c illustrates an antireflective coating 360 that has been applied on an underside of an active area 355, while the diagram shown in FIG. 3d illustrates the antireflective coating 360 that has been applied on edges of the active area 355 with a portion of the underside also being coated. The thickness of the antireflective coating 360 may not be drawn to scale. The antireflective coating 360 can be applied along an entire periphery of the active area 355. The diagram shown in FIG. 3e illustrates the antireflective coating 360 that has been applied only on edges of the active area 355 with no antireflective coating on the underside of the active area 355.

Figure 3F:
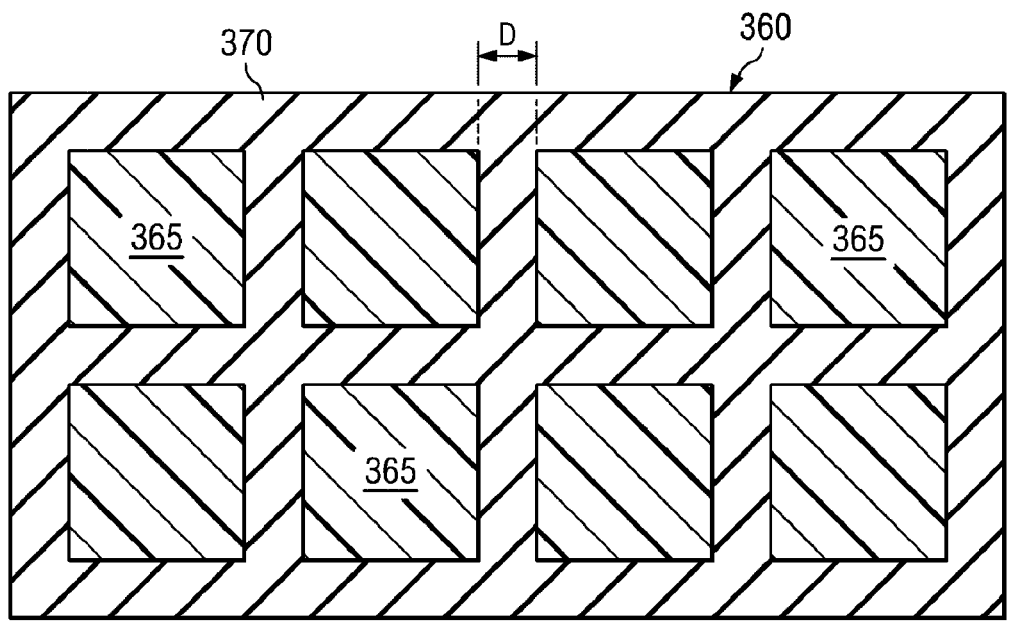

With reference now to FIG. 3f, there is shown a diagram illustrating a top view of an array of light modulators with an antireflective coating applied to portions of the array that are not active areas, according to a preferred embodiment of the present invention. The diagram shown in FIG. 3f illustrates a 4×2 array of light modulators, such as an array of liquid crystal elements (for example, liquid crystal element 365). An entirety of the liquid crystal element 365 is an active area. The light modulators in the array of light modulators are spaced a small distance apart (labeled distance 'D') creating channels, such as channel 370, between the light modulators in the array of light modulators. Within the channels 370 created by the spacing, electrical conductors (not shown) are routed to provide power as well as image data to the individual light modulators. According to a preferred embodiment of the present invention, an antireflective coating 360 can be applied to the array of light modulators, covering the channels 370 and any conductors routed in the channels 370.

Figure 4:
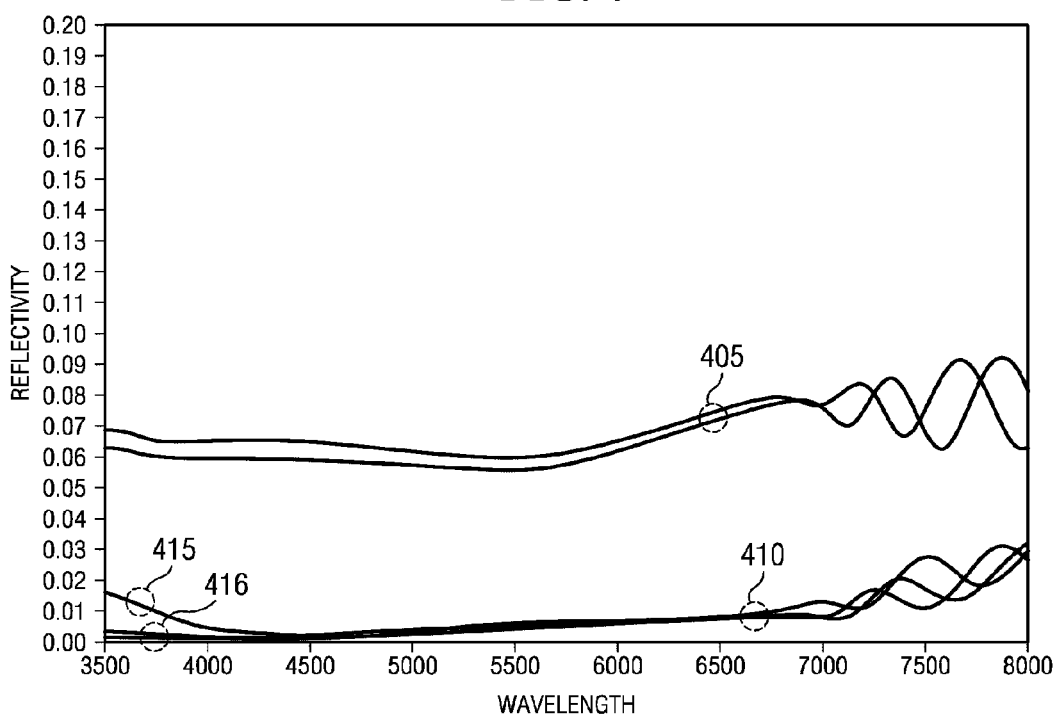
FIG. 4 is a diagram of a data plot of reflectivity of a dark polymer matrix with and without ash processing, according to a preferred embodiment of the present invention.

With reference now to FIG. 4, there is shown a data plot illustrating reflectivity of a dark polymer matrix with and without the ash processing as a function of light wavelength, according to a preferred embodiment of the present invention. A first set of curves 405 shows the reflectivity of a dark polymer matrix without the ash processing for a variety of viewing angles. Without the ash processing, the dark polymer matrix has a reflectivity of approximately 0.07 for a wide range of light wavelengths. A second set of curves 410 shows the reflectivity of a dark polymer matrix with the ash processing for a variety of viewing angles. With the ash processing, the reflectivity of the dark polymer matrix drops down to an average value of less than 0.01 for the same range of light wavelengths. The ash processing produces a substantial reduction in the reflectivity. The second set of curves 410 also shows that the application of a protective cap layer does not have a significant impact on the non-reflective properties of the dark polymer matrix. A comparison of curve 415 versus curve set 416 shows that except at small wavelengths, the reflectivity of the dark polymer matrix with the protective cap layer (curve 415) is substantially equal to the reflectivity of the dark polymer matrix alone (curve set 416).

Figure 5A:
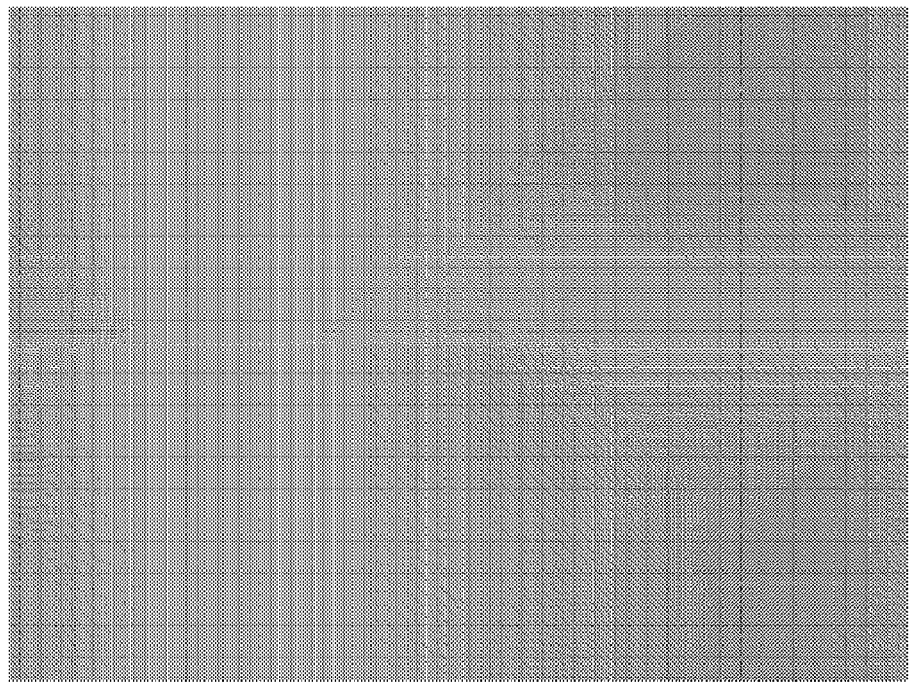
FIGS. 5a and 5b are diagrams of a surface of a dark polymer matrix prior to and after ash processing, according to a preferred embodiment of the present invention.
Figure 5B:
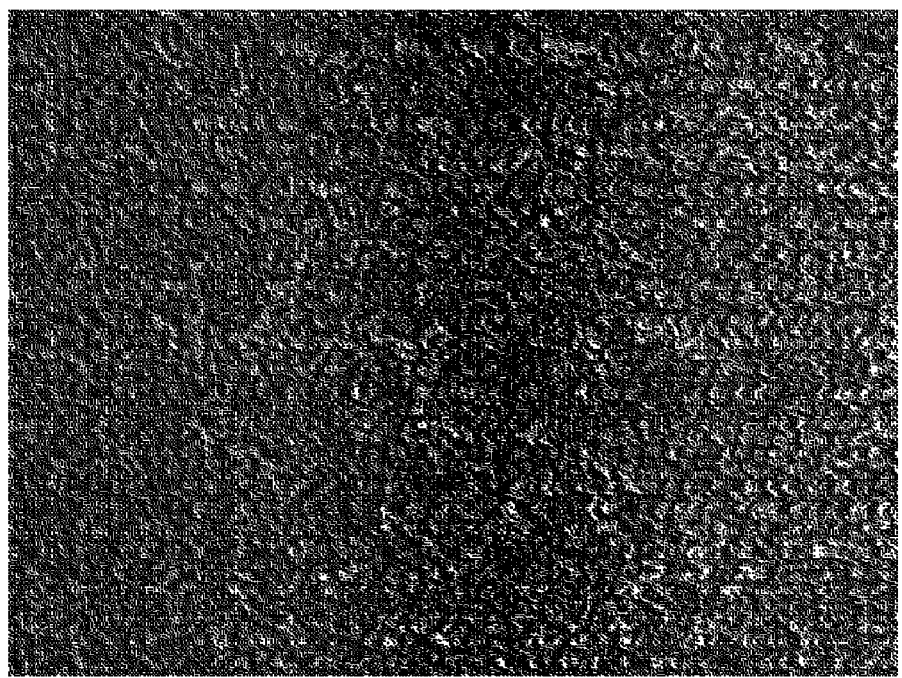

With reference now to FIGS. 5a and 5b, there are shown diagrams illustrating views of a surface of the dark polymer matrix, according to a preferred embodiment of the present invention. A diagram shown in FIG. 5a illustrates a view of the surface of the dark polymer matrix after being deposited on a reflective surface and prior to ash processing. The diagram shows a smooth surface that can reflect a significant amount of light. A diagram shown in FIG. 5b illustrates a view of the surface of the dark polymer matrix after ash processing. The diagram shows an irregular and rough surface that is capable of randomly dispersing any light that strikes it surface as well as being able to absorb some of the light.

Figure 6:
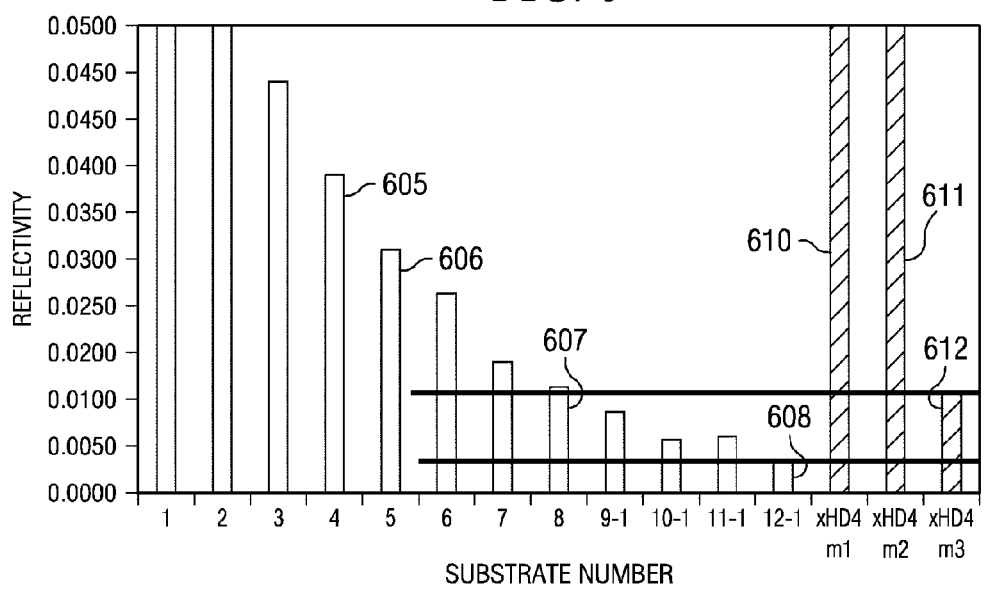
FIG. 6 is a diagram of a data plot of reflectivity for a variety of dark polymer matrices with differing ash process times, according to a preferred embodiment of the present invention.

With reference now to FIG. 6, there is shown a data plot illustrating reflectivity as a function of ash processing times, as well as comparing the reflectivity of the dark polymer matrix with several antireflective coatings, according to a preferred embodiment of the present invention. A first series of data points (such as bar 605, bar 606, bar 607, and bar 608) displays reflectivity for a dark polymer matrix layer covering on a wafer, wherein the dark polymer matrix layer has undergone ash processing for differing periods of time. For example, the bar 605 shows that the dark matrix layer has a reflectivity of approximately 0.0340 after having undergone ash processing for a first amount of time, wherein the first amount of time is on the order of 10 to 20 seconds, and the bar 608 shows that the dark matrix layer (of a different substrate) has a reflectivity of approximately 0.0034 after having undergone ash processing for a second amount of time, wherein the second amount of time was on the order of 50 to 60 seconds. In general, longer ash processing will typically result in a lower reflectivity. However, if the ash processing goes on for too long, undercutting of the dark matrix layer may occur, which may lead to the loss of the marks and formations formed in the dark matrix layer and can reduce the non-reflectivity of the dark matrix layer. Once the undercutting occurs and the marks and formations have been lost, additional ash processing can create new marks and formations to restore the lost non-reflectivity.

A second series of data points (such as bar 610, bar 611, and bar 612) displays reflectivity for existing antireflective coatings as well as a more advanced technique of creating a light trap from multiple layers of materials, each with differing diffraction indices. The data shown in the diagram illustrate that the dark polymer matrix with ash processing can deliver reflectivity that is better than existing antireflective coatings and more complex light trap structures with relatively simple processing requirements.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit comprising:
a substrate containing transistors and conductors, wherein the substrate is covered with an antireflective coating formed from a dark polymer matrix, the antireflective coating protected by an aluminum protective layer created by sputter deposition and then oxidized; and
an array of light modulators comprising an array of liquid crystal elements formed on top of the dark polymer matrix, the array of light modulators comprising electrodes formed on the dark polymer matrix and deflectable members spaced apart from the electrodes, the array of light modulators configured to modulate light based upon image data to display the image data on a display plane.

2. The integrated circuit of claim 1, wherein the antireflective coating is processed in an ash chamber to enhance its antireflective properties.

3. The integrated circuit of claim 1, wherein the array of light modulators comprises a plurality of individual light modulators with each individual light modulator having an active area, and wherein portions of the array of light modulators that are not active areas are also covered with an antireflective coating formed from a dark polymer matrix.

4. The integrated circuit of claim 1, wherein an area surrounding each liquid crystal element is coated with an antireflective coating formed from a dark polymer matrix.

5. The integrated circuit of claim 1, wherein electrical interconnects are run in an area surrounding each liquid crystal element.

6. An integrated circuit comprising:
a substrate containing transistors and conductors, wherein the substrate is covered with an antireflective coating formed from a dark polymer matrix, the antireflective coating protected by an aluminum protective layer created by sputter deposition and then oxidized; and
an array of light modulators formed on top of the dark polymer matrix, the array of light modulators comprising electrodes formed on the dark polymer matrix and deflectable members spaced apart from the electrodes, the array of light modulators configured to modulate light based upon image data to display the image data on a display plane.

7. The integrated circuit of claim 6, wherein the antireflective coating is processed in an ash chamber to enhance its antireflective properties.

8. The integrated circuit of claim 6, wherein the array of light modulators comprises a plurality of individual light modulators with each individual light modulator having an active area, and wherein portions of the array of light modulators that are not active areas are also covered with an antireflective coating formed from a dark polymer matrix.

9. The integrated circuit of claim 6, wherein the array of light modulators comprises an array of micromirrors, and wherein an edge of a micromirror is coated with an antireflective coating formed from a dark polymer matrix.

10. The integrated circuit of claim 6, wherein the array of light modulators comprises an array of liquid crystal elements, wherein electrical interconnections are run in an area surrounding each liquid crystal element, and wherein the area surrounding each liquid crystal element is coated with an antireflective coating formed from a dark polymer matrix.

* * * * *